United States Patent [19]
Yoshida

[11] Patent Number: 5,517,321
[45] Date of Patent: May 14, 1996

[54] VIDEO TAPE RECORDER HAVING AUTOMATIC REWINDING CAPABILITY

[75] Inventor: Takamichi Yoshida, Tokyo, Japan

[73] Assignee: Sony Corporation, Tokyo, Japan

[21] Appl. No.: 270,962

[22] Filed: Jul. 5, 1994

Related U.S. Application Data

[63] Continuation of Ser. No. 980,945, Nov. 24, 1992, abandoned.

[30] Foreign Application Priority Data

Nov. 29, 1991 [JP] Japan .................... 3-316857

[51] Int. Cl.⁶ .................................................. H04N 5/76
[52] U.S. Cl. ............................................. 358/335; 360/31
[58] Field of Search ............................. 358/335, 342, 358/310, 311, 337; 360/31, 69, 90, 13, 32

[56] References Cited

U.S. PATENT DOCUMENTS

| | | | |
|---|---|---|---|
| 4,280,159 | 7/1981 | Nakayama | 360/137 |
| 4,589,045 | 5/1986 | Koyama | 360/137 |
| 4,916,682 | 4/1990 | Tomoda et al. | 360/32 |
| 5,032,927 | 7/1991 | Watanabe et al. | 358/335 |
| 5,270,829 | 12/1993 | Yang | 358/335 |
| 5,390,027 | 2/1995 | Henmi et al. | 358/335 |

*Primary Examiner*—Tommy P. Chin
*Assistant Examiner*—Robert Chevalier
*Attorney, Agent, or Firm*—Pasquale Musacchio; Jerry A. Miller

[57] ABSTRACT

A video tape recorder measures the time remaining on a tape and compares this with the time programmed for a timer recording. If not enough tape remains to record the entire event, a warning is issued or the tape rewinds to provide room to record the entire event.

7 Claims, 4 Drawing Sheets

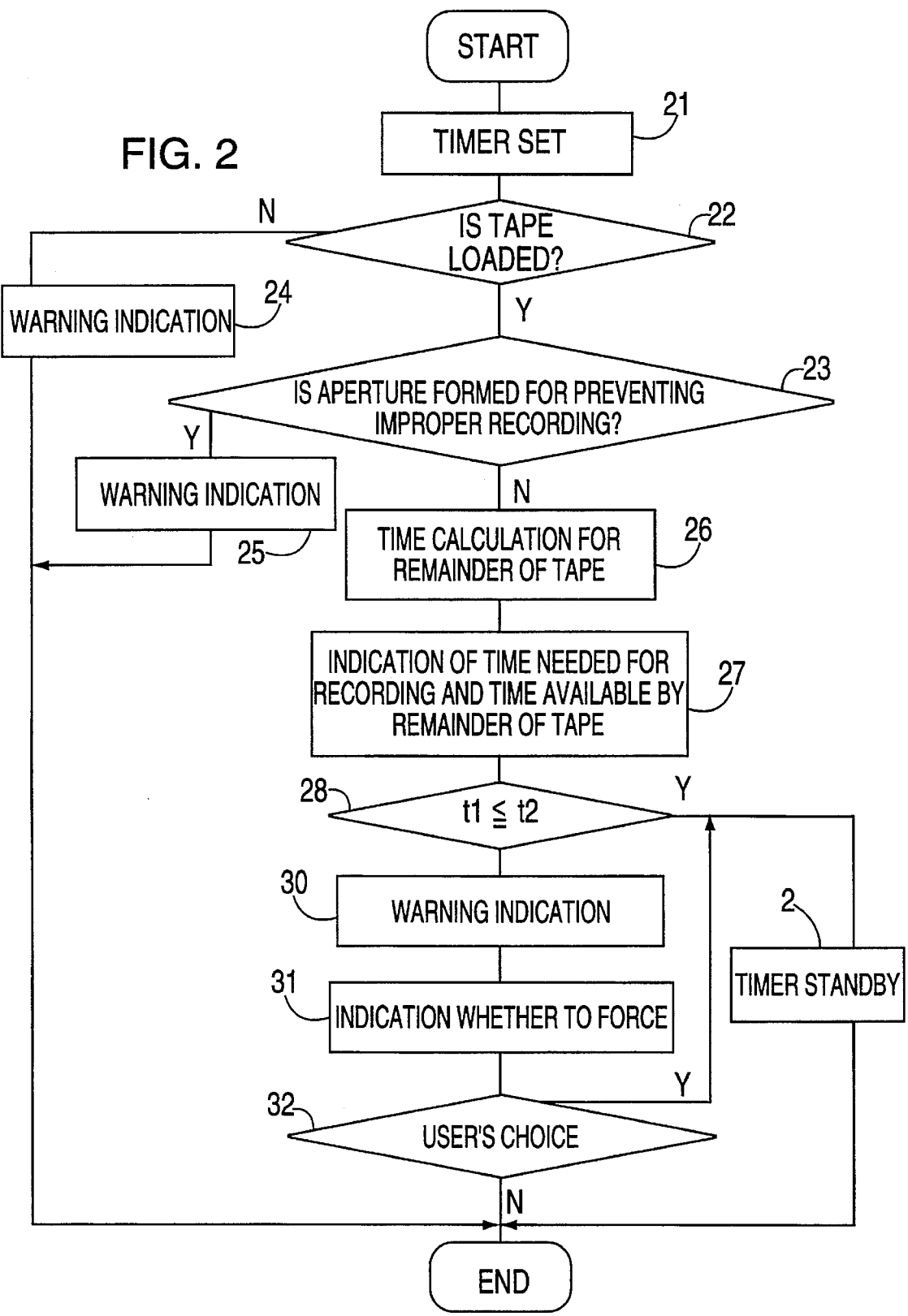

NO TAPE IS LOADED

FIG. 3A

APERTURE HAS BEEN FORMED FOR
PREVENTING IMPROPER RECORDING

FIG. 3B

TIME NEEDED FOR RECORDING - 2 HOURS
TIME AVAILABLE BY REMAINDER OF TAPE - 1.5 HOURS

FIG. 3C

THE REMAINDER OF TAPE IS INSUFFICIENT
FOR 30 MINUTES

FIG. 3D

WOULD YOU LIKE TO FORCE THE RECORDING?

FIG. 3E

VIDEO TAPE RECORDER HAVING AUTOMATIC REWINDING CAPABILITY

This is a continuation of application(s) Ser. No. 07/980,945 filed on Nov. 24, 1992, now abandoned which is hereby incorporated by reference.

BACKGROUND

1. Field of the Invention

The present invention relates to a Video Tape Recorder (VTR). In particular, the present invention relates to the Timer Recording function of a VTR.

2. Background of the Invention

When setting a Video Tape Recorder into a Timer Recording mode, the user should visually confirm whether there is sufficient tape remaining to record the desired event. However, if the user forgets to confirm it before setting up the Timer Recording, it is possible that a later part of the event might not be recorded if there is not enough tape to record the event. The same problem can occur if the user wrongly sets, for example, a Standard mode by mistake, though he actually intended to set the VTR to an Extended mode in which a tape runs one third (⅓) of the speed of the Standard mode.

SUMMARY OF THE INVENTION

It is, therefore, an object of the present invention to provide a Video Tape Recorder which resolves the above problem.

It is another object of the present invention to provide a Video Tape Recorder which can avoid a tape running out before recording the end of an event in its Time Recording mode.

In one aspect of the present invention, a Video Tape Recorder (VTR) includes a microcomputer for measuring time available for recording by a remainder of a tape. The microcomputer also compares the measured time with time needed for a recording of a complete event which is set by a user for a timer recording. The VTR further includes an indicator for generating a warning when the former time is shorter than the latter time as a result of a comparison by the microcomputer.

In another aspect of the present invention, a Video Tape Recorder (VTR) includes a microcomputer for measuring time available for recording on a remainder of a tape. The microcomputer also compares the measured time with time needed for a recording of a complete event which is set by a user for a timer recording. The VTR further includes a tape transport for rewinding the tape when the former time is shorter than the latter time as a result of a comparison by the computer.

In accordance with the one aspect of present invention, when the measured time corresponding to the remainder of tape is shorter than the time needed for complete recording of an event, either visual or audible warning is generated. The user easily recognizes the remainder of tape is insufficient for the complete recording. By manually setting the VTR in its rewinding mode or exchanging the video cassette for another, the user can avoid an occasion in which the end of event is unrecorded.

In accordance with the one aspect of present invention, when the measured time corresponding to the remainder of tape is shorter than the time needed for complete recording of an event, the VTR is automatically set into its rewind mode. The user may not even manually operate the VTR but can avoid an occasion in which the end of an event is unrecorded.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWING

FIG. 2 shows a flow chart of an embodiment of the present invention.

FIG. 3, which is made up of FIGS. 3A through 3E, shows examples of display for a monitor TV for the embodiment shown in FIG. 2.

DESCRIPTION OF THE INVENTION

Figure 1:
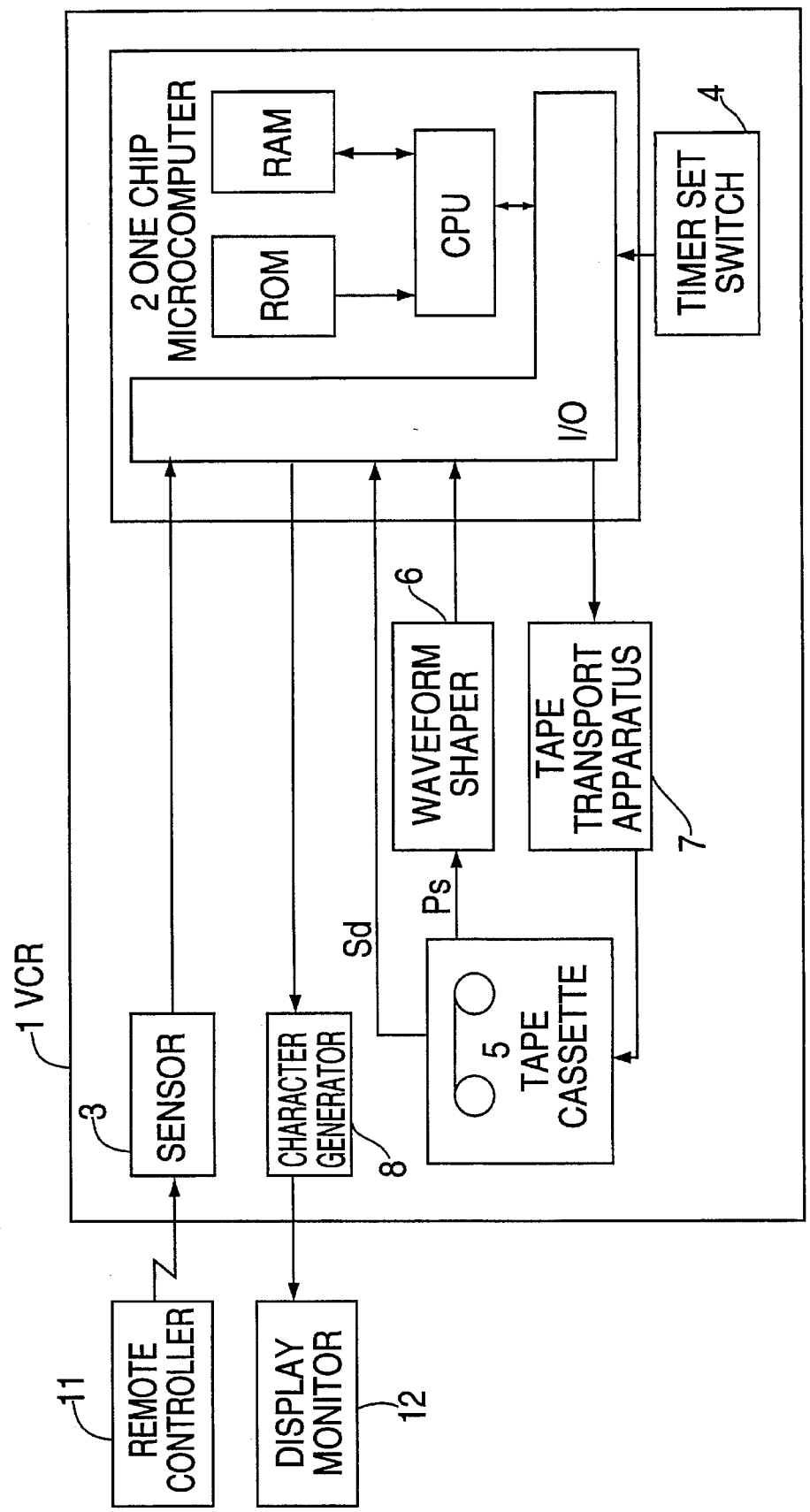
FIG. 1 shows a block diagram of a Video Tape Recorder.

Referring now to FIG. 1, a video cassette recorder (VCR) 1 includes a single chip microcomputer 2 which is made of ROM, RAM, CPU and I/O. A sensor apparatus 3 is provided in order to receive remote control signals, for example, by such as infrared rays from a remote controller 11. The remote control signal output from the sensor apparatus 3 is supplied to the microcomputer 2. The operations including the timer recording of VCR 1 can be set by the remote controller 11.

A timer set switch 4 is incorporated in the VCR 1 so as to set the time recording mode at the VCR without use of the remote controller 11.

A tape cassette 5 is loaded in the VCR 1. A device is mounted in the VCR 1 to generate pulses Ps during the rotation of supply reel in the tape cassette 5. For example, the device is made of a pulse generator which generates a single pulse for each rotation of the reel. The pulses Ps from the pulse generator is supplied to the microcomputer 2 through a waveform shaper 6.

At the microcomputer 2, as will be explained later, the remaining time of the tape is calculated when an user sets the timer recording mode. The rotations per second of the supply reel can be detected by pulses Ps, and by using the values of rotation per second and tape speed the remaining time of the tape can be calculated. The method for calculating the remaining time of the tape is well known and shown, for example, in a Japanese Patent Publication Sho 58-17992.

A mechanism is provided for detecting whether the cassette 5 is loaded and whether an aperture is formed in the cassette 5 to prevent improper recording. The respective detected signal Sd is supplied to the microcomputer 2. The microcomputer 2 can judge whether the cassette is loaded and whether an aperture is formed in the cassette, based on this detected signal Sd whenever the timer recording mode is set as described later.

A tape transport apparatus 7 drives reels in the cassette 5 and a capstan, etc.. The operation of this tape transport apparatus 7 is also controlled by the microcomputer 2.

As described later, a warning indication will appear, when timer recording mode is set, on the screen if the remaining time of tape is less than the time need for recording the desired program. A character generator 8 is provided for generating a character signal under the control from microcomputer 2 for this warning indication, etc.. The character signal is supplied to a monitor television 12.

Referring now to the flow chart of FIG. 2, the operation of microcomputer 2 when timer recording mode is set will be explained.

At a step 21, the timer recording mode is set by the user's operation of either the remote controller 11 or the timer set switch 4. Then, at steps 22 and 23, depending on the detected signal Sd, the microcomputer determines whether the tape cassette is loaded and whether an aperture is formed for preventing improper recording.

When it is judged that no cassette is loaded at the step 22, or it is judged that no recording is possible due to the aperture formed on the cassette 5 at the step 23, the character generator 8 generates a character signal providing a warning indication. The warning indications such as the examples shown in FIGS. 3A and 3B appear on the monitor television 12 at the respective steps 24 and 25. At this time, the timer recording mode cannot be set up without entering a stand-by mode.

Only when the tape cassette 5 is loaded and no aperture is detected, the tape transport apparatus starts operating to drive a tape at a constant speed (for example, at the tape speed in the standard mode). Pulses Ps are then generated by the generator and supplied through the waveform shaper to the microcomputer 2 so that the remaining time of the tape is calculated at step 26.

When the timer recording mode is set by the user, the following information is identified and stored into the RAM in microcomputer 2. The information may include a date of the event, a channel number, a time for starting, a time for ending, a tape speed (whether a standard mode or an extended mode).

At step 26, the remaining time on the tape is calculated by considering the tape speed. When the remaining time is calculated as T in the standard mode, it means 3T is remaining in the extended mode.

Next, the character generator 8 generates character signal corresponding to the time needed for recording the event [t1] (Time for ending—Time for starting) and the remaining time of the tape [t2]. The character signals corresponding to times [t1] and [t2] are then supplied to the monitor television 12, and the example message shown in FIG. 3C appears on the screen.

At step 28, it is judged whether the time remaining on tape [t2] is more than or equal to the time need for recording [t1]. When time [t2] is greater than or equal to time [t1], a timer stand-by mode is set at a step 29 and the operation is then terminated.

When the remaining time on tape [t2] is not greater than or equal to the time needed for recording [t1] at step 28, the character generator 8 generates character signal for a warning indication. The character signal is supplied to the monitor television 12. A warning, for example showing how much more tape is required as shown in FIG. 3D, appears on the screen at step 30.

After step 30, the character generator 8 generates a character signal for an indication whether or not to force recording. The character signal is then supplied to the monitor television 12. A warning, which for example asks whether or not to force recording as shown in FIG. 3E, appears on the screen at step 31.

While the monitor television 12 displays the indication of whether to force recording, the user makes a choice whether or not to force it at step 32. When the user selects a forced recording, a timer stand-by mode is set at step 29 and the operation is then terminated. At this time, it is impossible to record all of the event up to the end because the remaining time of tape [t2] is less than the time needed for recording [t1]. However, the user may sometimes want to record only at the beginning of the event.

When the user doesn't want to force recording, the operation is terminated without entering the timer stand-by mode.

As described above, according to this embodiment, the monitor television 12 displays a warning of insufficient time when the remainder time of tape [t2] is less than the time needed for recording [t1]. The user, therefore, can easily recognize how much more tape is required. Then the user may rewind the tape or exchange the tape cassette 5 to avoid failure to record the end of the event.

In addition, according to the above embodiment, the user can make a choice at the time of setting the timer recording whether to force recording when the time remaining on tape [t2] is less than the time needed for recording [t1]. The timer stand-by mode can be set without rewinding the tape or exchanging the tape cassette, even though it becomes impossible to record the end of event.

Figure 4:
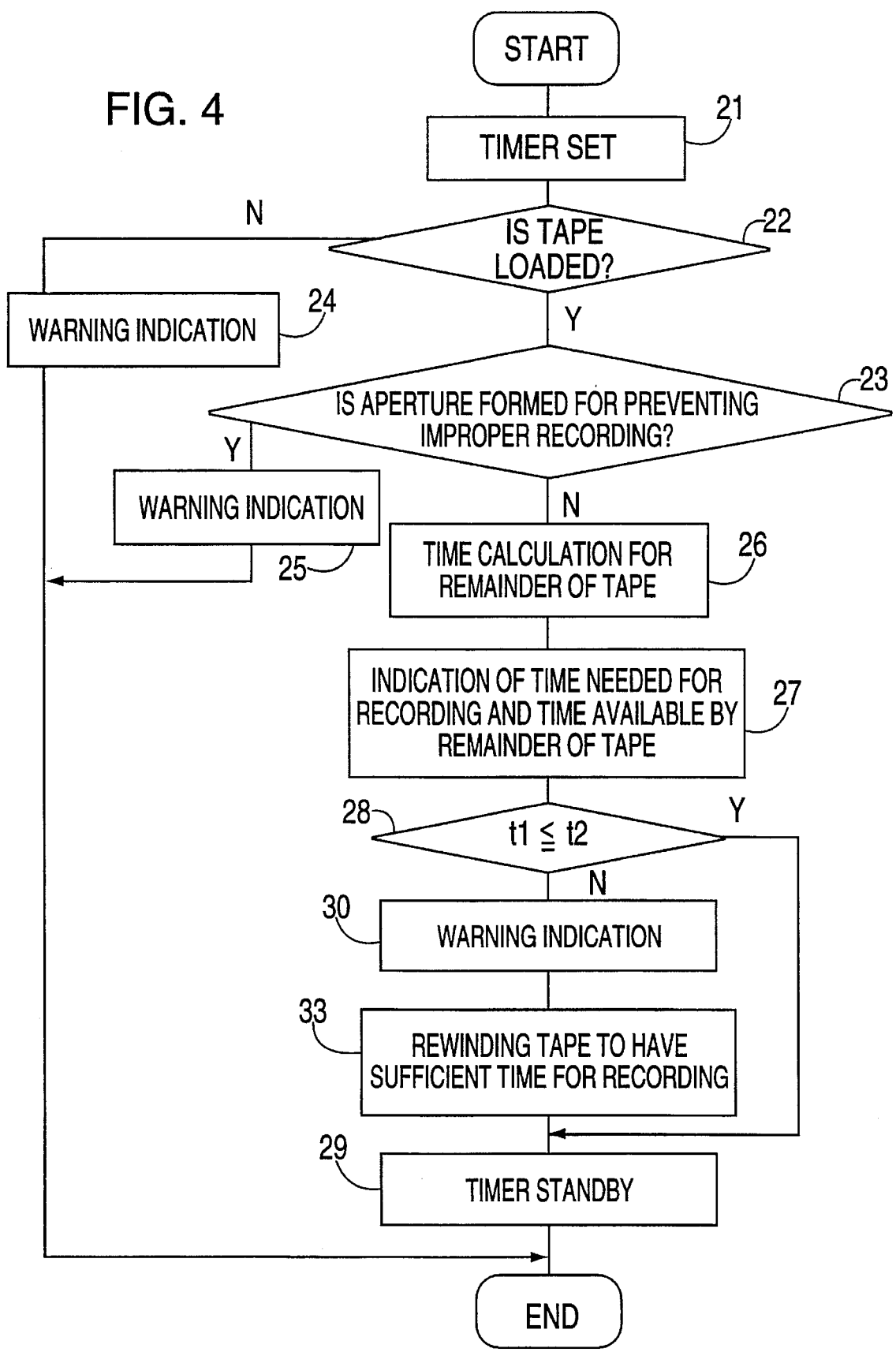
FIG. 4 shows a flow chart of another embodiment of the present invention.

Referring to the flow chart of FIG. 4, a second embodiment of the invention is disclosed. The same numerals are used to represent steps in common with those of FIG. 2. Unlike the first embodiment which requires the user to rewind the tape or exchange the tape cassette, this second embodiment automatically avoids the occurrence in which the end of event is unrecorded when the remaining time of tape [t2] is less than the time needed for recording [t1].

As shown in FIG. 4, after displaying the warning on the monitor television 12 at step 30, the tape transport mechanism 7 automatically rewinds the tape at step 33 to have sufficient time for recording. Thereafter, a timer stand-by mode is automatically set at step 29. Other steps in FIG. 4 are exactly the same as shown in FIG. 2.

According to the second embodiment shown in FIG. 4, when the remainder time of tape [t2] is less than the time needed for recording [t1], automatic rewinding is performed so that the time remaining on tape [t2] is made greater than the time needed for recording [t1]. It is, therefore, possible to avoid the occurrence in which the end of an event is unrecorded, without further operation by the user.

While specific embodiments of the invention have been shown and disclosed, it is to be understood that numerous changes and modifications may be made by those skilled in the art without departing from the scope and intent of the invention. For example, though the warning indication is performed by the character display in the above embodiment, luminescence or flushing by light emitting elements, synthesized voice, buzzer, or oscillating sound, or other audible warning, may replace the warning by character display on the monitor.

What is claimed is:

1. A video tape recorder comprising:

means for measuring time available for recording on a tape, wherein said time is measured before recording on said tape:

means for comparing said measured time with time needed for recording a complete event;

means for generating a warning when said measured time is shorter than said needed time as determined by said means for comparing; and rewinding means for automatically rewinding said tape before recording on said tape by an amount equivalent to the difference between said measured time and said needed time such that said measured time is equal to or greater than said needed time to enable recording of said complete event.

2. The video tape recorder of claim 1, wherein said needed time is determined from a time programmed for a timer recording.

3. The video tape recorder of claim 1, wherein said means for generating a warning includes means for generating a warning message on a video display.

4. The video tape recorder of claim 1, wherein said means for generating a warning includes means for generating a visual warning.

5. The video tape recorder of claim 1, wherein said means for generating a warning includes means for generating an audible warning.

6. The video tape recorder of claim 1, further comprising means for forcing a recording if said measured time is shorter than said needed time as determined by said means for comparing.

7. The video tape recorder of claim 1, wherein said means for measuring includes:

means for producing pulses each time a reel of said tape turns a complete revolution;

means for counting a number of said pulses; and means for computing said measured time from said number of pulses.

* * * * *